(12) United States Patent
Sambo et al.

(10) Patent No.: US 9,473,834 B2
(45) Date of Patent: Oct. 18, 2016

(54) ROUTING FOR SUPER CHANNEL FOR BANDWIDTH VARIABLE WAVELENGTH SWITCHED OPTICAL NETWORK

(75) Inventors: Nicola Sambo, Leghorn (IT); Giulio Bottari, Leghorn (IT); Piero Castoldi, Vicopisano (IT); Filippo Cugini, Fidenza (IT); Paola Iovanna, Rome (IT)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 48 days.

(21) Appl. No.: 14/417,550

(22) PCT Filed: Aug. 16, 2012

(86) PCT No.: PCT/EP2012/066029
§ 371 (c)(1),
(2), (4) Date: Jan. 26, 2015

(87) PCT Pub. No.: WO2014/015915
PCT Pub. Date: Jan. 30, 2014

(65) Prior Publication Data
US 2015/0215688 A1    Jul. 30, 2015

(30) Foreign Application Priority Data
Jul. 26, 2012  (EP) ..................................... 12178061

(51) Int. Cl.
| | |
|---|---|
| *H04J 14/02* | (2006.01) |
| *H04Q 11/00* | (2006.01) |
| *H04L 12/721* | (2013.01) |
| *H04L 27/26* | (2006.01) |

(52) U.S. Cl.
CPC ....... *H04Q 11/0062* (2013.01); *H04J 14/0212* (2013.01); *H04J 14/0257* (2013.01); *H04J 14/0261* (2013.01); *H04J 14/0267* (2013.01); *H04J 14/0298* (2013.01); *H04L 27/2697* (2013.01); *H04L 45/62* (2013.01); *H04Q 2011/0086* (2013.01); *H04Q 2011/0088* (2013.01)

(58) Field of Classification Search
CPC .................................................... H04J 14/0298
See application file for complete search history.

(56) References Cited

U.S. PATENT DOCUMENTS

| | | | |
|---|---|---|---|
| 2008/0159742 A1* | 7/2008 | Krishnaswamy ... | H04J 14/0227 398/79 |
| 2011/0164620 A1 | 7/2011 | Jinno et al. | |

OTHER PUBLICATIONS

Farrel et al., "A Path Computation Element (PCE)-Based Architecture", IETF RFC-4655, Aug. 2006.*

(Continued)

*Primary Examiner* — Shi K Li
(74) *Attorney, Agent, or Firm* — NDWE LLP

(57) ABSTRACT

In an optical communications network using bandwidth variable wavelength switching, routing and spectrum assignment for a traffic request for x sub-carriers of a super-channel, involves checking for an existing super-channel having sufficient potential sub-carriers not currently active. If not found, then possible paths for a new super-channel are identified and a path is selected and sub-carriers assigned. By trying first to use inactive potential sub-carriers of an existing super-channel, fewer super channels overall are needed, and thus fewer super transponders are needed. This can reduce blocking probabilities and can reduce capital costs. The search for possible paths can try to avoid or reduce overlap with spectrum of existing super channels, or compare possible paths by weighting according to amounts of overlap.

16 Claims, 10 Drawing Sheets

(56) References Cited

OTHER PUBLICATIONS

PCT International Search Report for PCT/EP2012/066029, mailed Oct. 10, 2012, 3 pages.
Christodoulopoulos, et al., Elastic Bandwidth Allocation in Flexible OFDM-Based Optical Networks, Journal of Lightwave Technology. vol. 29. No. 9, May 1, 2011, pp. 1354-1366.
Jinno, et al., Spectrum-Efficient and Scalable Elastic Optical Path Network: Architecture, Benefits, and Enabling Technologies, Topics in Optical Communications, IEEE Communications Magazine, vol. 47, No. 11, Nov. 2009, pp. 66-73.
Klinkowski, et al., A Routing and Spectrum Assignment Problem in Optical OFDM Networks, Proceedings of the 1st European Teletraffic Seminar (ETS), Feb. 14, 2011, 5 pages.
Shao, et al., Shared-Path Protection in OFDM-based Optical Networks with Elastic Bandwidth Allocation, Optical Fiber Communication Conference and Exposition (OFC/NFOEC) 2012 and the National Fiber Optics Engineers Conference, IEEE, Mar. 4, 2012, pp. 1-3.
Cugini, et al., "Demonstration of Flexible Optical Network Based on Path Computation Element", Journal of Lightwave Technology, vol. 30, No. 5, Mar. 1, 2012, pp. 727-733.
Dischler, et al., "Transmission of 1.2 Tb/s Continuous Waveband PDM-OFDM-FDM signal with Spectral Efficiency of 3.3 bits/Hz over 400 km of SSMF", IEEE, 2009, 3 pages.
Hussain, et al., "Generalized Label for Super-Channel Assignment on Flexible Grid draft-hussain-ccamp-super-channel-label-03.txt", Network Working Group, Mar. 11, 2012, pp. 1-15.
Sambo, et al., "Distributed Setup in Optical Networks with Flexible Grid", ECOC Technical Digest, Optical Society of America, 2011, 3 pages.
International Preliminary Report on Patentability, Application No. PCT/EP2012/066029, dated Feb. 5, 2015, 7 pages.

\* cited by examiner

FIG 1
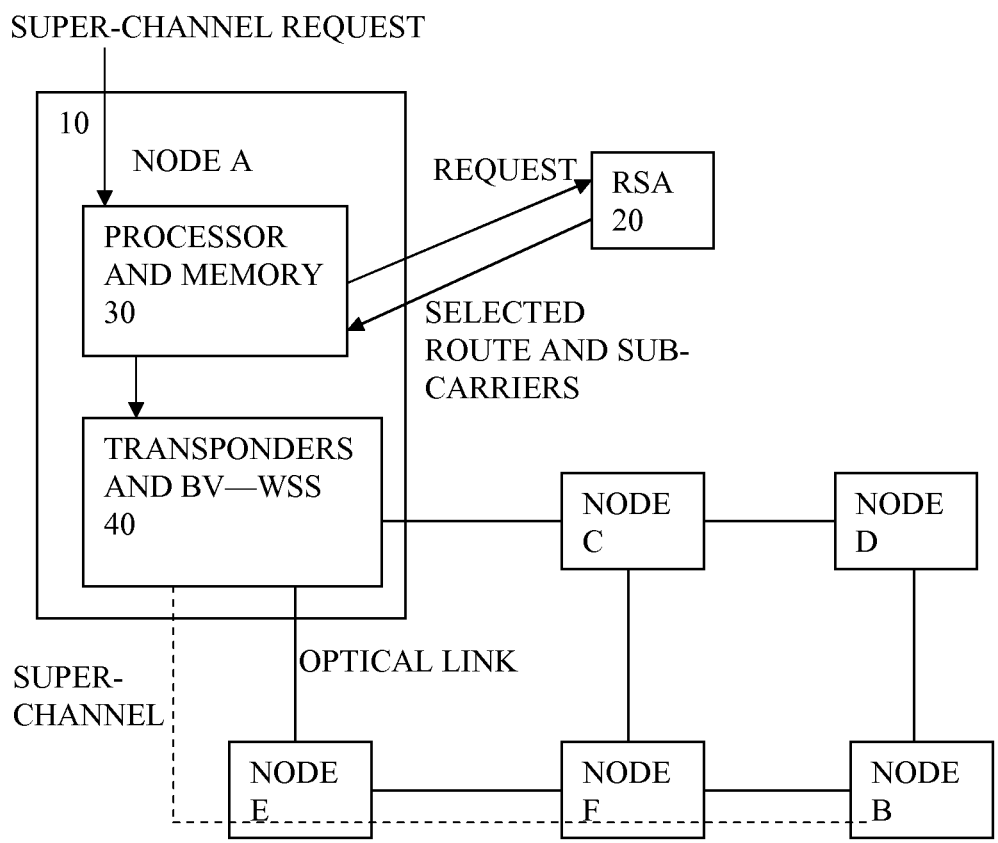
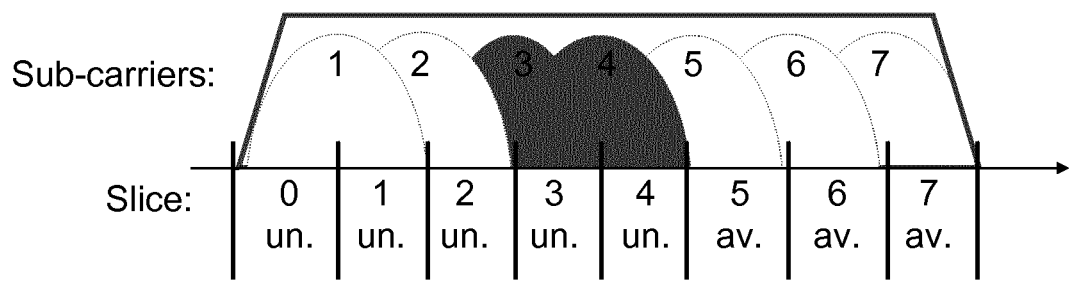
FIG 2

EXISTING SUPER-CHANNEL 3
POTENTIAL SUB-CARRIERS 6
ACTIVE SUB-CARRIERS 8
NEW SUPER-CHANNEL 5

130  SELECT A PATH FROM THE IDENTIFIED POSSIBLE PATHS

134  SELECT FROM THE POSSIBLE PATHS ACCORDING TO HOW MUCH FREQUENCY OVERLAP THEY HAVE WITH EXISTING- SUPER-CHANNELS

FIG 9

130 SELECT A PATH FROM THE IDENTIFIED POSSIBLE PATHS

134 SELECT FROM THE POSSIBLE PATHS ACCORDING TO HOW MUCH FREQUENCY OVERLAP THEY HAVE WITH EXISTING SUPER-CHANNELS

136 ASSIGN A LINK WEIGHT TO EACH FREQUENCY SLICE OF POTENTIAL SUB-CARRIERS FOR EACH LINK, ACCORDING TO HOW CLOSE IN FREQUENCY THEY ARE TO AN ACTIVE SUB-CARRIER OF THE SAME SUPER- CHANNEL

137 SUM THE LINK WEIGHTS FOR ALL LINKS ALONG A POSSIBLE PATH TO GIVE A PATH WEIGHT FOR EACH OF THE SLICES

138 SUM THE PATH WEIGHTS FOR ALL THE SLICES TO GIVE A TOTAL WEIGHT

139 SELECT FROM THE OVERLAP PATHS ACCORDING TO THEIR TOTAL WEIGHTS

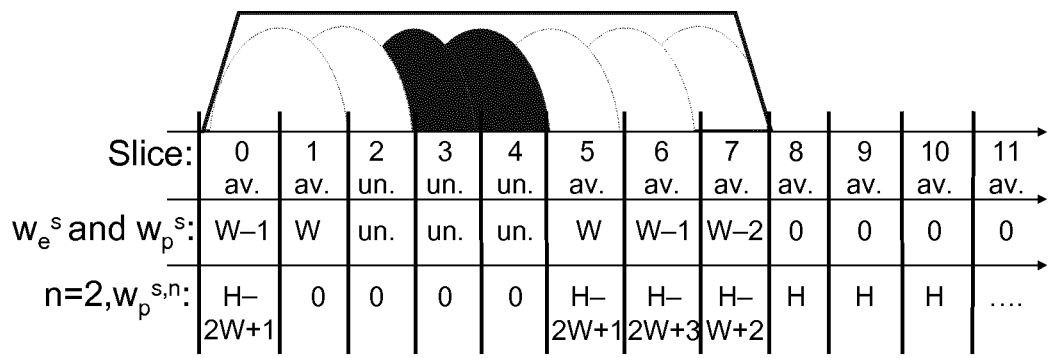
FIG 10
FIG 11
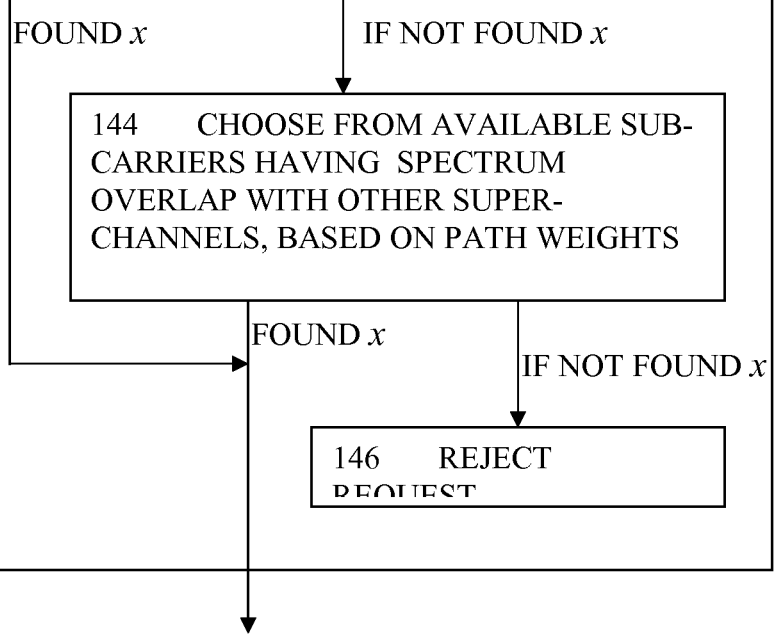

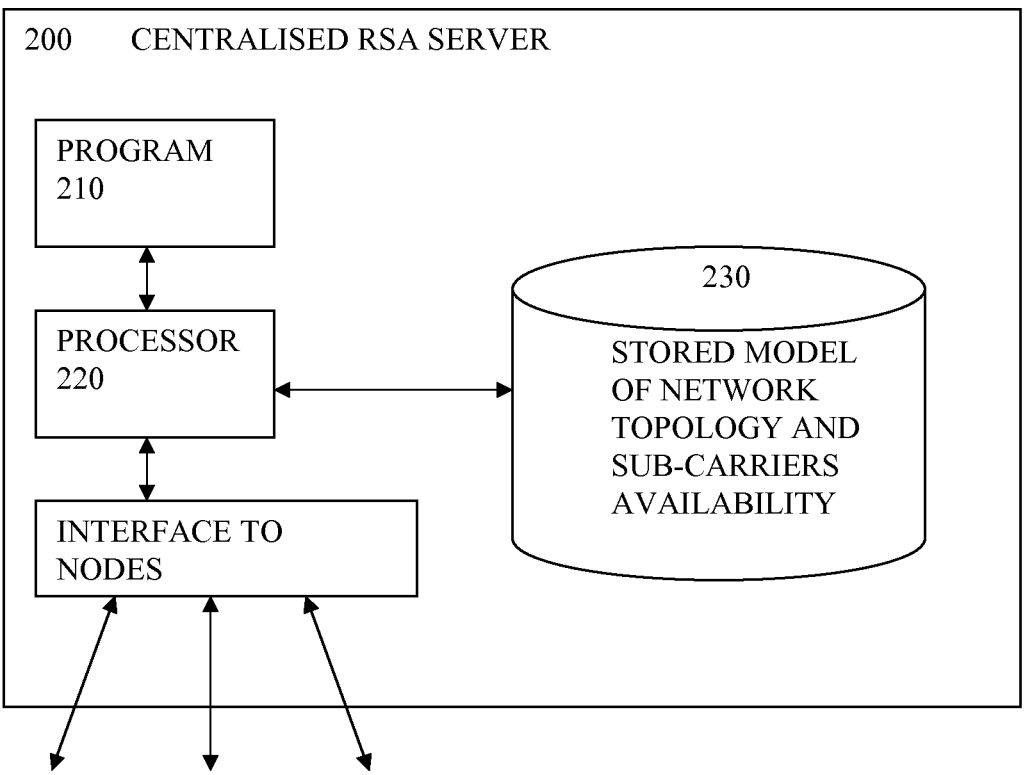

ROUTING FOR SUPER CHANNEL FOR BANDWIDTH VARIABLE WAVELENGTH SWITCHED OPTICAL NETWORK

CROSS-REFERENCE TO RELATED APPLICATIONS

This application is a National stage of International Application No. PCT/EP2012/066029, filed Aug. 16, 2012, which claims priority to EP Application No. 12178061.3, filed Jul. 26, 2012, which are hereby incorporated by reference.

FIELD

The present invention relates to methods of routing and spectrum assignment for a traffic request of x sub-carriers of a super-channel in an optical communications network, to nodes for such optical communications networks capable of bandwidth variable wavelength switching, to routing and spectrum assignment servers for such optical communications networks, and to corresponding computer programs.

BACKGROUND

Future networks are expected to support service upgrades to transmission rates of 100 Gb/s and beyond. Super-transponders (supporting multi-carrier super-channels) coupled with advanced multi-level modulation formats and bandwidth variable wavelength selective switches (BV-WSS) have become crucial elements for future spectral efficient networks. A super-channel represents an ultra high aggregate capacity channel carrying multiple sub-carriers which are co-routed through the network from the source to the destination.

Sub-carriers of a super-channel may require to be contiguous in the spectrum for technological reasons. Sub-carriers of a super-channel may or may not share a portion of spectrum resource with adjacent sub-carriers of the same super channel, i.e. they may or may not be superposed. A super-transponder is composed by a limited number M of sub-carriers. In the case that all the sub-carriers are activated, the super-channel experiences the maximum bit-rate. However, because of traffic dynamicity, the maximum bit-rate may be unnecessary and some sub-carriers may not be used (thus, possibly decreasing the power consumption), therefore not occupying network resources.

SUMMARY

Embodiments of the invention provide improved methods and apparatus. According to a first aspect of the invention, there is provided a method of routing and spectrum assignment for a traffic request of x sub-carriers of a super-channel in an optical communications network having nodes for bandwidth variable wavelength switching, involving checking whether there is an existing super-channel having the same source and destination, and having sufficient potential sub-carriers for the traffic request which are not currently active, and related link resources (i.e., spectrum) are available. If so, there are steps of selecting and assigning x of the potential sub-carriers for the traffic request. Otherwise, if sufficient such potential sub-carriers are not found, then there are steps of identifying possible paths for a new super-channel having at least x sub-carriers for the traffic request, and selecting a path for the new super-channel from the possible paths and assigning x sub-carriers of the selected path for the traffic request.

A benefit of trying first to use inactive sub-carriers of an existing super-channel is that fewer super channels overall are needed, and thus fewer super transponders are needed. This can reduce blocking probabilities and can reduce capital costs. See FIGS. 1 and 3 for example.

Any additional features can be added or disclaimed. Some such additional features are described in more detail. One such additional feature is the step of identifying possible paths for a new super-channel comprising identifying possible unreserved paths having x sub-carriers available and not overlapping with potential sub-carriers for other super-channels on any part of the possible paths. By seeking non overlapping light paths some frequency overlapping of super-channels can be avoided and thus there can be better use of resources. This matters since such overlap is likely to be for a small proportion of the links of a given super-channel, yet prevents that super-channel from using more of its possible bandwidth along the entire length of that super-channel. Therefore it can enable an increase in the average utilization of bandwidth of the super-channels and thus more efficient use of super transponders at ingress and egress. Thus, overall, fewer super transponders are needed for a given amount of traffic. Thus capital costs can be reduced. See FIG. 4 for example. Moreover, resources are not over-reserved.

Another such additional feature is the steps, if no possible unreserved paths are found, of identifying overlap paths which make use of sub-carriers reserved as potential sub-carriers for other super-channels, and selecting a path from the identified overlap paths. By making use of such overlap paths only after trying for unreserved paths, the use of resources can be improved and blocking reduced. See FIG. 5 for example.

Another such additional feature is the step of identifying possible paths for a new super-channel comprising identifying paths with potential sub-carriers (for other super-channels) overlap, and selecting a path from the identified overlap paths. This alternative, which does not distinguish between unreserved and overlap paths is also useful in combination with the first step of trying to use existing super-channels. See FIG. 5 or 6 for example.

Another such additional feature is the step of assigning spectrum for the x sub-carriers of the super-channel along the selected path. See FIG. 3 for example.

Another such additional feature is the step of selecting from the identified possible paths having a step of selecting according to how much frequency overlap they have with existing super-channels. This can help reduce the overall amount of overlap and thus make better use of resources. See FIG. 8 for example.

Another such additional feature is the step of selecting according to how much overlap they have by assigning a link weight to each frequency slice for each link, according to how close they are to an active sub-carrier of the same super-channel. This can enable accurate assessment of how much frequency overlap there is. See FIGS. 9 and 10 for example.

Another such additional feature is the step of summing the link weights along a respective one of the overlap paths, to provide a path weight of that overlap path. This can also enable accurate assessment of how much frequency overlap there is. See FIGS. 9 and 10 for example.

Another such additional feature is the step of summing the path weights for all the sub-carriers of a respective one of the overlap paths, to provide a total weight, and having the step of selecting from the overlap paths according to their total weights. This can also help enable accurate assessment of how much frequency overlap there is. See FIGS. 9 and 10 for example.

Another such additional feature is the step of assigning spectrum comprising selecting available sub-carriers according to a first fit method. This is a relatively simple step, particularly suitable if there is no need to use potential sub-carriers reserved for some of the links by other super-channels. See FIG. 11 for example.

Another such additional feature is the step of assigning spectrum comprising selecting potential sub-carriers according to the path weights. This can help limit the overall amount of frequency overlap. See FIG. 11 for example.

Another such additional feature is the x sub-carriers having contiguous frequencies. See FIGS. 2 and 10 for example.

Another such additional feature is the selecting of a path from the identified possible paths comprising selecting according to how many different possible combinations of sub-carriers each of the possible paths has. This can help avoid congesting particular links, and thus help reduce a blocking probability. See FIG. 12 for example.

Another aspect provides a node for an optical communications network capable of bandwidth variable wavelength switching, having an interface configured to receive a traffic request of x sub-carriers of a super-channel, transponders and bandwidth variable wavelength selective switches configured to implement super-channels having sub-carriers, and a processor and memory. These are configured to check whether there is an existing super-channel having the same source and destination, and having sufficient potential sub-carriers which are not currently active, and for which spectrum resources are available, for the traffic request, and if so, to control the transponders and bandwidth variable wavelength selective switches to select and assign x of the potential sub-carriers for the traffic request. The processor and memory are configured so that otherwise, if sufficient such potential sub-carriers are not found, they are configured to identify possible paths for a new super-channel having at least x sub-carriers for the traffic request, and to select a path for the new super-channel from the possible paths and to assign x sub-carriers of the selected path for the traffic request.

Another such additional feature is the node being configured to carry out routing and spectrum assignment operation internally for the traffic request. See FIGS. 1 and 14 for example.

Another such additional feature is the node being configured to request a centralized routing and spectrum assignment server to carry out routing and spectrum assignment externally for the traffic request. See FIGS. 1 and 13 for example.

Another aspect of the invention provides a routing and spectrum assignment server for an optical communications network capable of bandwidth variable wavelength switching. The server has interfaces with nodes of the network having transponders and bandwidth variable wavelength switches configured to receive a traffic request of x sub-carriers of a super-channel, and a processor and memory. These are configured to check whether there is an existing super-channel having the same source and destination, and having sufficient potential sub-carriers which are not currently active, and for which the spectrum resources are available for the traffic request, and if so, to select and assign x of the potential sub-carriers for the traffic request, and to communicate the selection and assignment to one or more of the nodes. The processor and memory are configured so that otherwise, if sufficient such potential sub-carriers are not found, they are configured to identify possible paths for a new super-channel having at least x sub-carriers for the traffic request, and to select a path for the new super-channel from the possible paths and to assign x sub-carriers of the selected path for the traffic request, and to communicate the selection and assignment to one or more of the nodes.

Another aspect of the invention provides a computer program having instructions which when executed by a processor cause the processor to carry out a method of routing and spectrum assignment for a traffic request of x sub-carriers of a super-channel in an optical communications network. See FIGS. 1 and 13 for example.

Any of the additional features can be combined together and combined with any of the aspects. Other effects and consequences will be apparent to those skilled in the art, especially over compared to other prior art. Numerous variations and modifications can be made without departing from the claims of the present invention. Therefore, it should be clearly understood that the form of the present invention is illustrative only and is not intended to limit the scope of the present invention.

BRIEF DESCRIPTION OF THE DRAWINGS

How the present invention may be put into effect will now be described by way of example with reference to the appended drawings, in which:

FIG. 1 shows a schematic view of a network having a node according to an embodiment, FIG. 2 shows a frequency spectrum for sub-carriers of a super channel, FIG. 7 shows a frequency spectrum for sub-carriers of overlapping super channels, FIGS. 8 and 9 show method steps showing ways of selecting a path according to embodiments, FIG. 10 shows a frequency spectrum for sub-carriers showing calculated weights for different frequency slices, FIG. 11 shows steps in selecting sub-carriers according to an embodiment, FIG. 12 shows a step of selecting from the possible paths according to an embodiment, FIG. 13 shows a schematic view of a centralized RSA server according to an embodiment.

DETAILED DESCRIPTION

Figure 3:
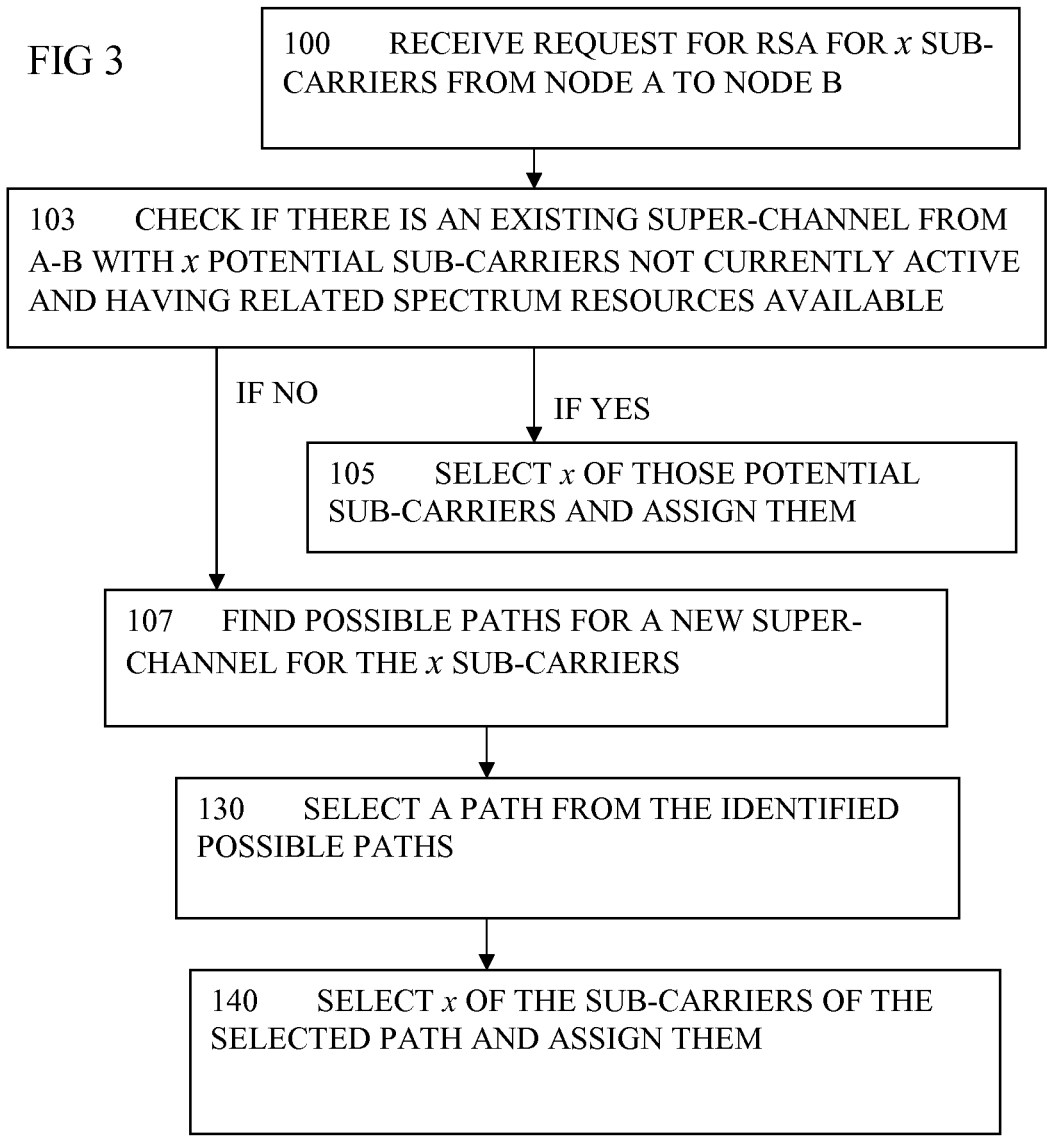
FIG. 3 shows a method according to an embodiment.

The present invention will be described with respect to particular embodiments and with reference to certain drawings but the invention is not limited thereto but only by the claims. The drawings described are only schematic and are non-limiting. In the drawings, the size of some of the elements may be exaggerated and not drawn to scale for illustrative purposes.

DEFINITIONS

Where the term "comprising" is used in the present description and claims, it does not exclude other elements or steps and should not be interpreted as being restricted to the means listed thereafter. Where an indefinite or definite article is used when referring to a singular noun e.g. "a" or "an", "the", this includes a plural of that noun unless something else is specifically stated.

Elements or parts of the described nodes or networks may comprise logic encoded in media for performing any kind of information processing. Logic may comprise software encoded in a disk or other computer-readable medium and/or instructions encoded in an application specific integrated circuit (ASIC), field programmable gate array (FPGA), or other processor or hardware.

References to nodes can encompass any kind of switching node, not limited to the types described, not limited to any level of integration, or size or bandwidth or bit rate and so on.

References to software can encompass any type of programs in any language executable directly or indirectly on processing hardware.

References to processors, hardware, processing hardware or circuitry can encompass any kind of logic or analog circuitry, integrated to any degree, and not limited to general purpose processors, digital signal processors, ASICs, FPGAs, discrete components or logic and so on. References to a processor are intended to encompass implementations using multiple processors which may be integrated together, or co-located in the same node or distributed at different locations for example.

References to a potential sub-carrier are intended to encompass any non-active sub-carrier of an active transponder supporting a super-channel. A potential sub-carrier does not occupy resources, but could be activated if necessary, utilizing the same super-transponder.

References to paths are intended to encompass routes through the network, or light paths or optical paths and are typically defined by at least a list of nodes along the path.

ABBREVIATIONS

DWDM Dense wavelength division multiplexing
RSA: routing spectrum assignment
N: number of nodes
L: number of links
M: maximum number of sub-carriers per super-transponder
$w_e^s$, $w_p^s$, $w_p^{s,n}$: weights
MaxWeightSlice: maximum weighted slice combinations Introduction to Problems of Existing Methods By way of introduction to the embodiments, how they address some issues with conventional designs will be explained. Super-channels are an evolution of DWDM in which several optical carriers are combined to create a composite signal of the desired capacity. With a traditional routing and spectrum assignment (RSA) (e.g., exploiting first-fit spectrum assignment), it may happen that a successive super-channel request is provisioned in the way that its sub-carriers overlap in frequency (also called overlap in spectrum) with the potential sub-carriers of another super-channel along common links. In this case, the potential sub-carriers cannot be activated because link resources are occupied by another super-channel (super-channel overlapping). Hence, blocking of traffic is experienced.

Introduction to Features of Embodiments

Figures 7, 8:
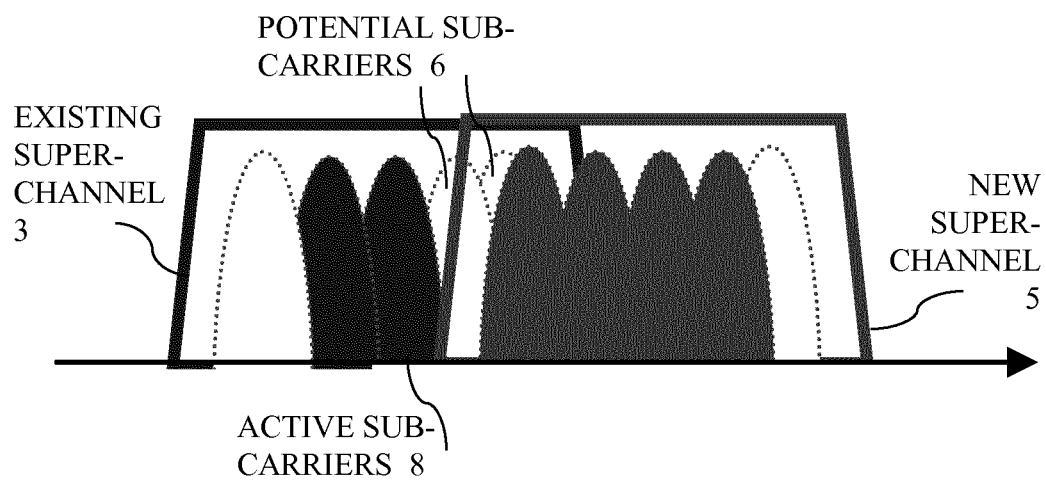

Some embodiments described below have two alternative procedures (described as Excluded and Weighted), to help minimize potential super-channel overlapping and to avoid the over-reservation of network resources. For a given offered traffic the number of required super-transponders and/or the blocking probability can be reduced. The two alternative procedures are for the establishment of super-channels accounting for sub-carrier dynamicity. The two procedures try to avoid overlapping between (potential) sub-carriers of different super-channels, as shown in FIG. 7, without over-reserving link resources (i.e., frequency slices) for potential (thus, non-activated) sub-carriers.

Avoiding the overlapping between potential sub-carriers can increase the probability of finding available link resources when new sub-carriers of a super-channel have to be activated. At the same time, resources are not over-reserved so that, anyhow, new super-channels can be provisioned when the occupation of resources does not permit to avoid super-channel overlapping. By limiting potential super-channel overlapping, while avoiding over-reservation of link resources, embodiments can help obtain low blocking probability and can reduce the number of required super-transponders installed in the network.

FIG. 1 Network Having a Node According to an Embodiment

FIG. 1 shows a schematic view of a network having a node according to an embodiment. The network is an optical communications network capable of bandwidth variable wavelength switching. A number of nodes A to F are shown, with links between them, there may be many more nodes in a typical network. Node A is shown in more detail and has a processor and memory 30, having an interface configured to receive a traffic request of x sub-carriers of a super-channel. The node has transponders and bandwidth variable wavelength selective switches 40 configured to implement super-channels having sub-carriers. These are controlled by the processor 30 and memory which are configured to respond to the new traffic request starting a routing procedure. This can involve an external RSA server 20 or can be carried out internally. In either case it involves checking whether there is an existing super-channel having the same source and destination, and having sufficient potential sub-carriers which are not currently active, and for which spectrum resource is available for the traffic request. If yes, then the processor controls the transponders and bandwidth variable wavelength selective switches to select and assign x sub-carriers for the new traffic request.

The processor and memory are operable so that otherwise, if sufficient such potential sub-carriers are not found, they can identify possible paths for a new super-channel having at least x sub-carriers for the traffic request, and to select a path for the new super-channel from the possible paths and to assign x sub-carriers of the selected path for the traffic request. Again this can be done internally to the node in some cases, or by using an external RSA server.

FIG. 2 Frequency Spectrum of a Super Channel

FIG. 2 shows a frequency spectrum for sub-carriers of a super channel. In this case there are seven subcarriers shown each spreading over two adjacent frequency slices, and each subcarrier overlapping with adjacent ones so that there are seven sub-carriers for eight slices. There can be many more slices and sub-carriers in typical networks. In this case, the super channel is partially used and sub-carriers 3 and 4 are active. This leaves sub-carriers 1, 2, 5, 6, and 7. Of these sub-carriers 1 and 2 are shown in FIG. 2 as "un" meaning unavailable, which could be because some other super channel (or any kind of channel) uses these frequency slices over some links of the path where the two paths share the same links. Sub-carriers 5, 6 and 7 are shown as "av" meaning available. If a super-channel request composed of X sub-carriers from source a to destination b is received, the processor tries to use a partially used super-transponder (i.e., co-routed resources). To do so, the partially used super-transponder supporting a super-channel activated from a to b along a path p: i) must have X available sub-carriers; ii) the frequency slices for the X sub-carriers, contiguous to the ones in use by the super-channel, must be available along p. Considering the example in FIG. 2, a super-channel is active between a-b, using sub-carriers 3-4. The status (available—av., unavailable—un.) of each slice along p is reported. Assuming a new request of X=2, 5 sub-carriers in FIG. 4 could be used (1, 2, 5, 6, 7), but only slices related to sub-carriers 5-7 are available along p. The new request can use a partially used super-transponder (e.g., sub-carriers 5-6). If not possible (e.g., no super-channels active between a-b, or no available link resources for potential sub-carriers), the use of a new super channel is needed which means a different transponder is required.

FIG. 3, Method of Routing According to an Embodiment

FIG. 3 shows steps according to an embodiment running on the network of FIG. 1 for example. This embodiment has steps of receiving 100 a request for RSA for x sub-carriers from node A to node B. Next is a step of checking 103 whether there is an existing super-channel having the same source and destination, and having sufficient potential sub-carriers for the traffic request which are not currently active, and for which there are link resources available. If yes, there is a step 105 of selecting and assigning x of the potential sub-carriers for the traffic request. Otherwise, if sufficient such potential sub-carriers are not found, then there are steps of identifying 107 possible paths for a new super-channel having at least x sub-carriers for the traffic request, and selecting 130 a path for the new super-channel from the possible paths. At step 140 x sub-carriers of the selected path are assigned for the traffic request. By trying first to use inactive sub-carriers of an existing super-channel, fewer super channels overall may be needed, and thus fewer super transponders are needed. This can reduce blocking probabilities and can reduce capital costs.

Figure 4:
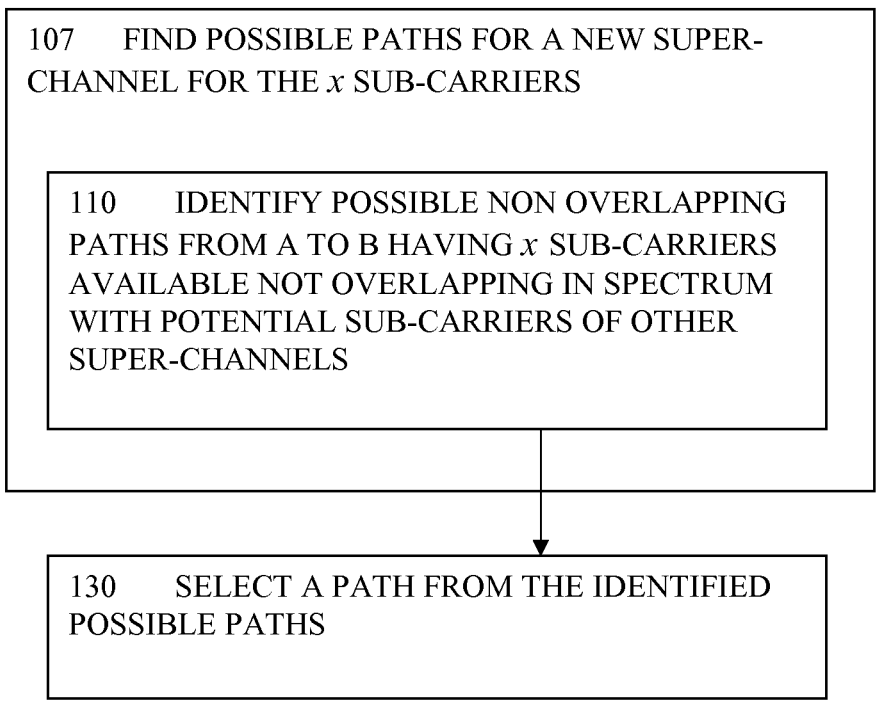
FIGS. 4, 5 and 6 show finding possible paths according to embodiments.
Figure 5:
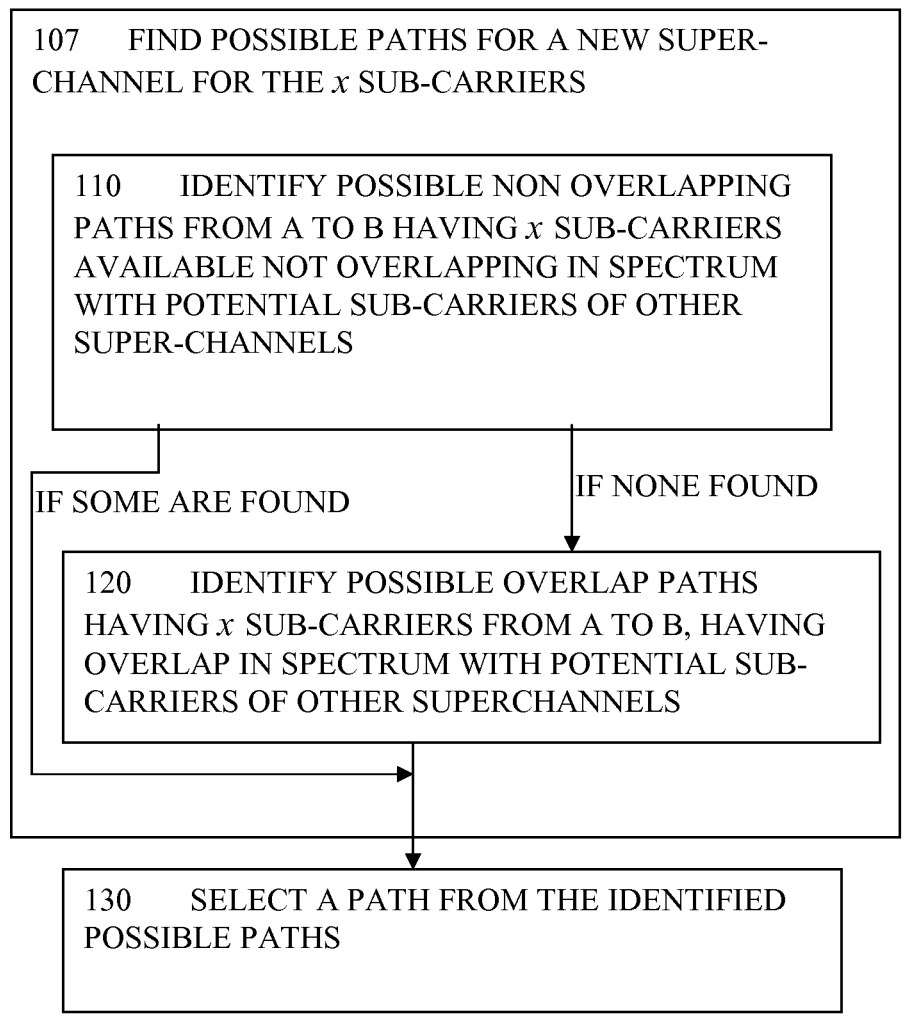
Figure 6:
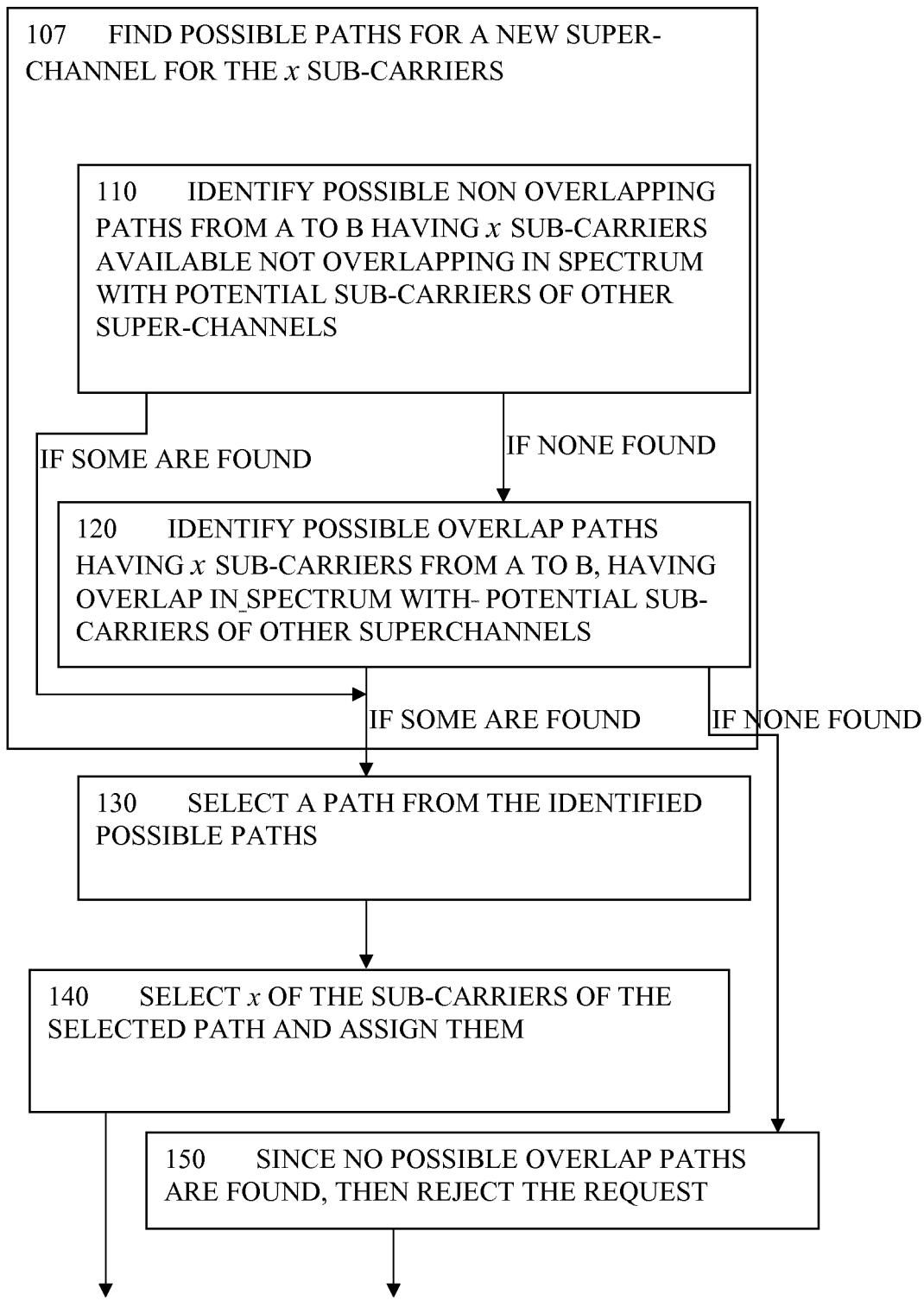

FIGS. 4, 5 and 6, Finding Possible Paths

FIGS. 4 to 6 show finding possible paths according to some embodiments. Step 107 of identifying possible paths for a new super-channel having at least x sub-carriers for the traffic request can be implemented in various ways. This is implemented in FIG. 4 by a step 110 of identifying possible paths having x sub-carriers available for which there are available spectrum resources and which does not overlap in spectrum with potential sub-carriers for other super-channels on any part of the possible paths. This is followed by the step 130 of selecting a path from the possible paths. By seeking non overlapping light paths some frequency overlapping of super-channels can be avoided and thus there can be better use of resources. This matters since such overlap is likely to be for a small proportion of the links of a given super-channel, yet prevents that super-channel from using more of its possible bandwidth along the entire length of that super-channel. Therefore it can enable an increase in the average utilization of bandwidth of the super-channels. This means a reduction in over reservation of link bandwidth, and thus more efficient use of super transponders at ingress and egress. Thus, overall, fewer super transponders are needed for a given amount of traffic.

FIG. 5 shows an alternative implementation of identifying possible paths for a new super-channel having at least x sub-carriers for the traffic request. This has the same step 110 as shown in FIG. 4, and has a further step 120, if no possible non-overlapping paths are found, of identifying overlap paths which have spectrum resources available and which make use of spectrum which would be used by potential sub-carriers for other super-channels, and selecting a path from these identified overlap paths. This is followed by the step 130 of selecting a path from the possible paths. By making use of such overlap paths only after trying for non overlapping paths, the trade off between efficient use of resources and reducing blocking can be improved.

FIG. 6 shows another possible implementation. As in FIG. 5 there is the same step 110 and a further step 120, if no possible non overlapping paths are found, of identifying overlap paths which make use of sub-carriers which overlap in spectrum with potential sub-carriers for other super-channels, and selecting a path from the identified overlap paths. This is followed by the step 130 of selecting a path from the possible paths if some paths are found, and then step 140 in which x sub-carriers of the selected path are assigned for the traffic request. If no overlap paths are found at step 120, there is a step 150 of rejecting the request.

FIG. 7, Spectrum of Overlapping Super Channels

FIG. 7 shows a frequency spectrum for sub-carriers of overlapping super channels. This shows on the left an existing super channel 3 having two active sub-carriers 6 and three potential sub-carriers 8. A new super channel is shown overlapping in spectrum. The new super channel has four active channels, two of which use spectrum resources related to the potential subcarriers of the existing super channel. This restricts the existing super channel and means it cannot be expanded to use those potential sub-carriers. Hence the precedures described aim to avoid or minimize this illustrated overlap. This spectrum will be the same for all links if the overlapping super channels share the same path for the entire length of the path. In other cases where the paths are shared for only some of the length of the paths, the spectrum will differ for different links depending on whether they are shared or not.

FIGS. 8, 9, Implementations of Step 130 of Selecting a Path

FIGS. 8 and 9 show method steps involved in different ways of selecting a path according to embodiments. In FIG. 8, step 130 of selecting a path from the identified possible paths involves step 134 of selecting according to how much frequency overlap they have with existing super channels.

FIG. 9 shows a more detailed view of an implementation of step 134, alternative implementations can be envisaged for some or all of this implementation. In FIG. 9 step 134 of selecting according to how much frequency overlap they have with existing super channels has sub steps as follows. Step 136 involves assigning a link weight to each slice (i.e., portion of the spectrum) for each link, according to how close they are to an active sub-carrier of an existing super-channel. A weight of zero may be given if the slice is not within the spectrum of an existing super-channel. Then there is a step of summing 137 the link weights along a respective one of the overlap paths, to provide a path weight of that overlap path. A step of summing 138 the path weights for all the sub-carriers of a respective one of the overlap paths, to provide a total weight for a given path selection, is followed by a step 139 of selecting from the overlap paths according to their total weights. This can help enable choosing a path with no overlap, or if none are found, choosing a less or least overlapped path. This can help enable a more accurate selection to optimize how much overlap there is, to make more efficient use of potential sub-carriers. If more use is made of non overlapping spectrum by avoiding spectrum of potential sub-carriers, then fewer new super channels are likely to be needed when those existing super channels try to expand their bandwidth and thus more efficient use is made of transponders and costs can be reduced.

FIG. 10, Spectrum Showing Weights Calculated for Each Slice

FIG. 10 shows a frequency spectrum for sub-carriers showing calculated weights for different frequency slices. Two alternative procedures (called Excluded and Weighted) will be described in relation to this figure and in respect of a network composed of N nodes and L links. Each node is equipped with BV-WSSs. Flexible grid is assumed considering an optical spectrum of 320 frequency slices of 12.5 GHz per link (an overall 4 THz bandwidth per link). Nodes are also equipped with super-transponders, each one supporting a super-channel composed by a set of sub-carriers. A super-transponder can transmit a super channel having a limited number M of sub-carriers.

A super-channel request composed of X sub-carriers from source a to destination b is considered. Both Excluded and Weighted procedures try to use a partially used super-transponder (i.e., co-routed resources). To do so, the partially used super-transponder supporting a super-channel activated from a to b along a path p: i) must have X available sub-carriers; ii) the frequency slices for the X sub-carriers, contiguous to the ones in use by the super-channel, must be available along p. If no super-channels are active between a-b, or if there are no available link resources for potential sub-carriers, then a new super channel and thus use of a different transponder is required.

When a different super-transponder is used, routing is performed by selecting a path from a set $P_{a,b}$ of paths connecting a-b. Assume that the request of X sub-carriers of a new super-channel requires n slices. Excluded and Weighted procedures are clarified with the example in FIG. 10, showing sub-carriers and potential sub-carriers of a working super-channel (with M=7) traversing a generic link e. The status of each slice s on link e is reported. To provision a super-channel with a different super-transponder, the two procedures differ as follows.

Excluded Procedure:

Routing (R): in a first step, the frequency slices in links traversed by super-channels and belonging to potential sub-carriers of those super-channels are considered as unavailable (slices 0-7 in FIG. 10 are all considered unavailable in link e, even if available). Then, the maximum slice combinations (MaxSlice) algorithm is run: the path within $P_{a,b}$ maximizing the number of possible combinations of n contiguous slices satisfying the continuity constraint along the path is selected. If no path having n slices satisfying the continuity constraint is found, the frequency slices belonging to potential sub-carriers of working super-channels are considered as available and the MaxSlice is re-run. If no path having n slices satisfying the continuity constraint is found, the request is blocked.

Spectrum Assignment (SA): similarly as for routing, the frequency slices belonging to potential sub-carriers are considered as unavailable. The first available set of n consecutive slices (first-fit) satisfying the continuity constraint along the path is selected. If n consecutive slices satisfying the continuity constraint are not found, the frequency slices belonging to potential sub-carriers of working super-channels are considered as available. If n consecutive slices satisfying the continuity constraint are not found even in this case, the request is blocked.

Weighted Procedure:

Weighted is based on weights assigned to slices. A weight $w_e^s$ is associated to each slice s of each link e. The minimum weight zero is associated to the available slices which do not cause overlapping with potential sub-carriers of working super-channels (slices 8-11 in FIG. 10). Weights to available slices potentially causing overlapping with other sub-carriers are given in a decreasing way, starting from W, while getting far from active sub-carriers (as shown in FIG. 10, $w_e^{s=5}=W$, $w_e^{s=6}=W-1$, $w_e^{s=7}=W-2$). Then, a weight $w_p^s$ is associated to slice s of path p only if s satisfies the continuity constraint. $w_p^s$ is set as the sum of weights $w_e^s$ for each e belonging to p. In FIG. 10, a single-link path is assumed, thus $w_e^s=w_p^s$. Finally, the weight $w_p^{s,n}$ is computed on the set of n contiguous slices starting from s, along path p. If at least a slice within the set of n slice does not satisfy the continuity constraint, $w_p^{s,n}$ is set to 0, otherwise $w_p^{s,n}=H-\Sigma_{c=s}^{s+n-1}w_p^c$, with (H>>W). In FIG. 10, a request of n=2 slices is assumed, thus, for instance, $w_p^{s=1,n=2}=0$ being slice 2 unavailable, $w_p^{s=5,n=2}=H-2W+1$ being slices 5-6 in overlap with potential sub-carriers, and $w_p^{s=9,n=2}=H$ being slices 9-10 outside the region of potential sub-carriers. The weight $w_p^{s,n}$ linearly decreases with the number of times a slice within the set of n slices overlaps with a potential sub-carrier of other super-channels. $w_p^{s,n}$ is the maximum if all the slices within the set do not overlap with any potential sub-carrier.

Routing (R): a maximum weighted slice combinations (MaxWeightSlice) algorithm is run: the path within $P_{a,b}$ maximizing the sum of $w_p^{s,n}$ for each slice s is selected. If no path having n slices satisfying the continuity constraint is found, the request is blocked.

Spectrum assignment (SA): the set of slots maximizing $w_p^{s,n}$ is selected. Possible ties are broken by selecting the set such that s has the lowest index (in FIG. 10, slices 8-9).

FIG. 11 Sub Carrier Selection

FIG. 11 shows steps in selecting sub-carriers according to an embodiment, showing steps in implementing step 140 of selecting x of the sub-carriers of the selected path and assign them. Step 142 uses a first fit method to choose which of the available sub-carriers along the selected path to use. If there are not enough available sub-carriers, then step 144 involves choosing from available sub-carriers having no spectrum overlap and those having spectrum overlap with potential sub-carriers of other super channels, based on path weights calculated, as explained above. If still x sub-carriers cannot be found, then the request is rejected at step 146. Otherwise the x selected sub-carriers are assigned to the new traffic request, the transponders and bandwidth variable wavelength switches are set up and the traffic can be transmitted along the path.

FIG. 12, Another Implementation of Selecting the Path

FIG. 12 shows a step of selecting from the possible paths according to another embodiment. In this case, step 130 of selecting a path from the identified possible path is implemented by step 132. This involves selecting according to which of the possible paths has a maximum number of different combinations of sub-carriers. This can help avoid congesting particular links, and thus help reduce a blocking probability.

FIG. 13, Centralized RSA Server

FIG. 13 shows a schematic view of a centralized RSA server 200 according to an embodiment. A processor 220 has a memory storing a program 210 for running RSA algorithms. The processor has access to a stored model 230 of network topology, sub-carrier availability, and spectrum availability (i.e. slices). An interface 240 is provided for coupling the server to the nodes of the network. This enables the RSA server to receive requests from nodes for routing to be carried out. The RSA server can execute the procedures set out above and can return resulting paths in the form of lists of nodes and links and sub-carrier assignments.

Figure 14:
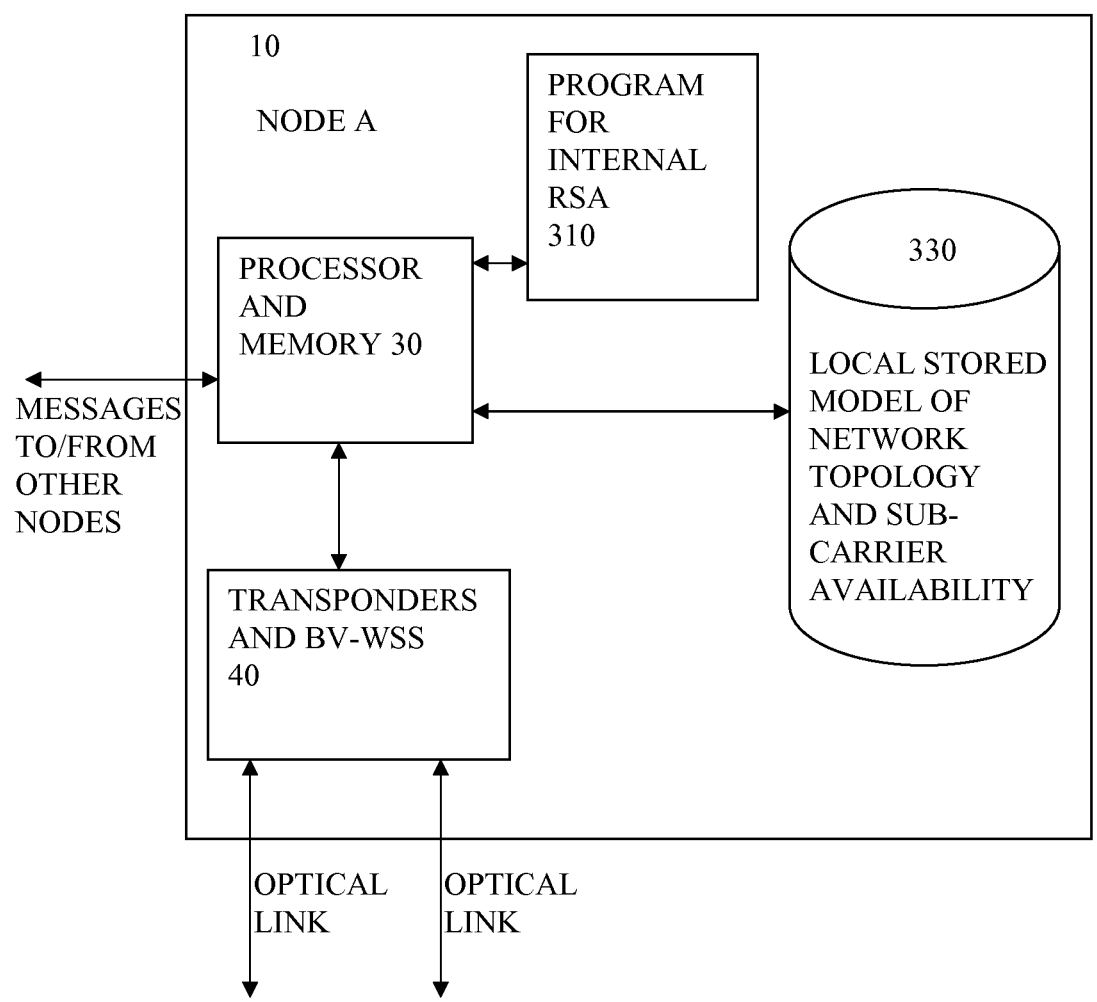
FIG. 14 shows a schematic view of a node according to an embodiment using internal RSA.

FIG. 14, Node Having Internal RSA

FIG. 14 shows a schematic view of a node according to an embodiment using internal RSA. The processor and memory 30 is coupled to a stored program 310 which enables the processor to run the internal RSA algorithms, which can be for example the procedures set out above which can return a selected path in the form of a list of nodes and links and sub-carrier assignments. To run these algorithms the processor has access to a local store 330 storing a model of network topology, sub-carrier availability, and spectrum availability (i.e. slices). This helps to reduce the need for communications bandwidth to pass requests and results to and from a centralized RSA server. However it is usually harder to keep distributed local models of the topology and availability up to date. In any case the benefits of the routing procedures described above are applicable to both centralized and distributed network routing scenarios.

Comparisons of Four Different Algorithms

An example network topology was simulated with N=30 and L=55. Super-channels were composed of a maximum of M=5 sub-carriers. Each node is equipped with 40 super-transponders. Inter-arrival process of X=1 sub-carrier requests (of four slices) were Poissonian, the holding time following a negative exponential distribution with mean $5 \cdot 10^4$ s, with requests uniformly distributed among all node pairs. $P_{a,b}$ was composed of all paths within one hop from the shortest path. Excluded and Weighted procedures as described above were compared with two benchmark procedures called Unaware and Overloaded-Unaware. Both Unaware and Overloaded-Unaware try to use potential sub-carriers if possible, in contrast to Excluded and weighted which first try to find sufficient unreserved sub-carriers avoiding the potential sub-carriers. Otherwise the benchmark procedures are unaware of potential sub-carriers. Their routing was MaxSlice. For both, spectrum assignment was first-fit. Overloaded-Unaware, differs from Unaware, in that it over-reserves resources for potential sub-carriers.

The blocking probability versus traffic load was noted for varying inter-arrival time. Overloaded-Unaware experienced the highest blocking probability because resources are over-reserved even if sub-carriers are not used, thus link resources are quickly consumed. Excluded and Weighted obtained a blocking lower than Unaware because they were more likely able to use active super-transponders preventing their exhaustion. With Unaware, which does not consider the potential sub-carriers among different super-transponders, successive super-channel requests are likely provisioned with overlapping among potential sub-carriers of different super-channels. Weighted obtained lower blocking than Excluded. Indeed, when overlapping cannot be avoided, Weighted minimizes the amount of overlapping (maximizes $w_p^{s,n}$), thus a larger number of potential sub-carriers can be activated.

The percentage of established requests that use potential sub-carriers of active super-transponders was also recorded. Weighted showed a higher percentage of reuse than Excluded and Unaware because it minimized the amount of overlapping. Overloaded-Unaware showed a higher percentage of reuse than Unaware, but link resources were wasted (high blocking). At high loads, Overloaded-Unaware obtained a higher reuse than the other procedures because it establishes only potential sub-carriers, while new super-channels are likely blocked. With the increase of load, the percentage of super-transponder reuse decreased because the M sub-carriers of super-transponders are more likely used or the link-resources which avoid overlapping with potential sub-carriers are busy.

Table 1 shows the average number of super-transponders in use, for some loads which guarantee a blocking lower than $10^{-3}$. With Weighted and Excluded a smaller number of super-transponders are used than is the case with Unaware. In particular, at 900 Erlang, Weighted and Excluded obtained a reduction of 15-16% with respect to Unaware under the stated conditions.

TABLE 1

Average number of used super-transponders in a simulation.

|  | Unaware | Excluded | Weighted |
| --- | --- | --- | --- |
| 700 Erlang | 610 | 518.9 | 512.1 |
| 900 Erlang | 768.2 | 666.4 | 644.5 |

Of course other results may be obtained for other embodiments and other test conditions.

Benefits of some embodiments can include the following. They can help reduce the number of super-transponders installed in the network. They can help obtain higher throughput (i.e., super-channel overlapping is avoided or reduced and link resources are not wasted with over-reservation). It can help save energy if fewer transponders are used and if unnecessary sub-carriers are switched off. It can be applied to both centralized and distributed network scenarios, and is compatible with the recent evolution of the G.694.1 ITU grid.

Other variations and embodiments can be envisaged within the claims.

The invention claimed is:

1. A method of routing and spectrum assignment for a traffic request of x sub-carriers of a super-channel in an optical communications network having nodes for bandwidth variable wavelength switching, the method comprising:
   checking whether there is an existing super-channel having the same source and destination as in the traffic request, and having sufficient potential sub-carriers for the traffic request which are not currently active, and for which link resources are available;
   if so, selecting and assigning x of the potential sub-carriers for the traffic request;
   otherwise, if sufficient such potential sub-carriers are not found, then identifying possible paths for a new super-channel having at least x sub-carriers for the traffic request; and
   selecting a path for the new super-channel from the identified possible paths and assigning x sub-carriers of the selected path for the traffic request;
   wherein identifying the possible paths for the new super-channel comprises identifying possible non overlapping paths having available link resources for x sub-carriers and not overlapping in spectrum with potential sub-carriers for other super-channels on any part of the possible paths; and
   wherein if no possible non overlapping paths are found, identifying overlap paths using spectrum overlapping with that of potential sub-carriers for other super-channels, and wherein selecting the path for the new super-channel comprises selecting from the identified overlap paths.

2. The method of claim 1, wherein identifying the possible paths for the new super-channel comprises identifying overlap paths using spectrum overlapping with that of potential sub-carriers for other super-channels, and selecting a path from the identified overlap paths.

3. The method of claim 1, further comprising assigning spectrum for the x sub-carriers of the new super-channel along the selected path.

4. The method of claim 3, wherein selecting from the identified overlap paths is performed according to how much frequency overlap they have with existing super-channels.

5. The method of claim 4, wherein selecting according to how much overlap they have comprises assigning a link weight to each frequency slice of each link, according to how close they are to an active sub-carrier of an existing super-channel from the existing super-channels.

6. The method of claim 5, wherein selecting according to how much overlap they have further comprises summing the link weights along a respective one of the identified overlap paths, to provide a path weight of that frequency slice of the overlap path.

7. The method of claim 6, wherein selecting according to how much overlap they have further comprises summing the path weights for all the frequency slices of the potential sub-carriers of a respective one of the overlap paths, to provide a total weight, and wherein selecting the path for the new super-channel from the identified overlap paths is performed according to their total weights.

8. The method of claim 7, wherein assigning spectrum comprises selecting potential sub-carriers according to their path weights.

9. The method of claim 1, wherein the x sub-carriers have contiguous frequencies.

10. The method of claim 1, wherein selecting the path from the identified possible paths comprises selecting according to how many different possible combinations of sub-carriers each of the identified possible paths has.

11. A node for an optical communications network capable of bandwidth variable wavelength switching, the node having:
an interface to receive a traffic request of x sub-carriers of a super-channel;
transponders and bandwidth variable wavelength selective switches to implement super-channels having sub-carriers; and
a processor and a non-transitory computer-readable medium storing instructions which, when executed by the processor, cause the node to check whether there is an existing super-channel having the same source and destination as in the traffic request, and having sufficient potential sub-carriers which are not currently active, and for which link resources are available, for the traffic request, and if so, to control the transponders and bandwidth variable wavelength selective switches to select and assign x of the potential sub-carriers for the traffic request,
wherein the instructions, when executed by the processor, further cause the node, if sufficient such potential sub-carriers are not found, to identify possible paths for a new super-channel having at least x sub-carriers for the traffic request, and to select a path for the new super-channel from the identified possible paths and to assign x sub-carriers of the selected path for the traffic request;
wherein identifying the possible paths for the new super-channel comprises identifying possible non overlapping paths having available link resources for x sub-carriers and not overlapping in spectrum with potential sub-carriers for other super-channels on any part of the possible paths; and
wherein the instructions, when executed by the processor, further cause the node, if no possible non overlapping paths are found, to identify overlap paths using spectrum overlapping with that of potential sub-carriers for other super-channels, and wherein selecting the path for the new super-channel comprises selecting from the identified overlap paths.

12. The node of claim 11 configured to carry out routing and spectrum assignment operation internally for the traffic request.

13. The node of claim 11 configured to request from a centralized routing and spectrum assignment server, to carry out routing and spectrum assignment externally for the traffic request.

14. A routing and spectrum assignment server for an optical communications network capable of bandwidth variable wavelength switching, the server having:
interfaces with nodes of the network having transponders and bandwidth variable wavelength switches to receive a traffic request of x sub-carriers of a super-channel, and
a processor and a non-transitory computer-readable medium storing instructions which, when executed by the processor, cause the server to check whether there is an existing super-channel having the same source and destination as in the traffic request, and having sufficient potential sub-carriers which are not currently active, and for which link resources are available, for the traffic request, and if so, to select and assign x of the potential sub-carriers for the traffic request, and to communicate the selection and assignment to one or more of the nodes,
wherein the instructions, when executed by the processor, further cause the serve, if sufficient such potential sub-carriers are not found, to identify possible paths for a new super-channel having at least x sub-carriers for the traffic request, and to select a path for the new super-channel from the identified possible paths and to assign x sub-carriers of the selected path for the traffic request, and to communicate the selection and assignment to one or more of the nodes;
wherein identifying the possible paths for the new super-channel comprises identifying possible non overlapping paths having available link resources for x sub-carriers and not overlapping in spectrum with potential sub-carriers for other super-channels on any part of the possible paths; and
wherein the instructions, when executed by the processor, further cause the server, if no possible non overlapping paths are found, to identify overlap paths using spectrum overlapping with that of potential sub-carriers for other super-channels, and wherein selecting the path for the new super-channel comprises selecting from the identified overlap paths.

15. A non-transitory computer readable medium having instructions stored therein, which when executed by a processor cause the processor to perform operations of routing and spectrum assignment for a traffic request of x sub-carriers of a super-channel in an optical communications network, the operations comprising:
checking whether there is an existing super-channel having the same source and destination as in the traffic request, and having sufficient potential sub-carriers for the traffic request which are not currently active, and for which link resources are available;
if so, selecting and assigning x of the potential sub-carriers for the traffic request;

otherwise, if sufficient such potential sub-carriers are not found, then identifying possible paths for a new super-channel having at least x sub-carriers for the traffic request; and selecting a path for the new super-channel from the identified possible paths and assigning x sub-carriers of the selected path for the traffic request;

wherein identifying the possible paths for the new super-channel comprises identifying possible non overlapping paths having available link resources for x sub-carriers and not overlapping in spectrum with potential sub-carriers for other super-channels on any part of the possible paths; and wherein if no possible non overlapping paths are found, identifying overlap paths using spectrum overlapping with that of potential sub-carriers for other super-channels, and wherein selecting the path for the new super-channel comprises selecting from the identified overlap paths.

16. The non-transitory computer readable medium of claim 15, wherein identifying the possible paths for the new super-channel comprises identifying overlap paths using spectrum overlapping with that of potential sub-carriers for other super-channels, and selecting a path from the identified overlap paths.

* * * * *